Figure 1:
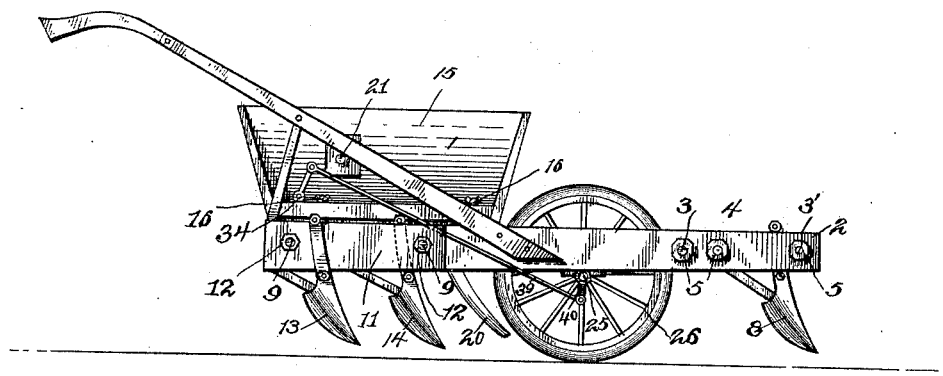

(No Model.) 2 Sheets—Sheet 1.

J. PENNINGTON.
COMBINED PLOW AND SEED PLANTER.

No. 600,291. Patented Mar. 8, 1898.

Witnesses:
Fenton S. Belt.
J. A. Wilson.

Inventor:
Jerry Pennington,
by H. B. Willson & Co.,
Attorneys.

THE NORRIS PETERS CO., PHOTO-LITHO., WASHINGTON, D. C.

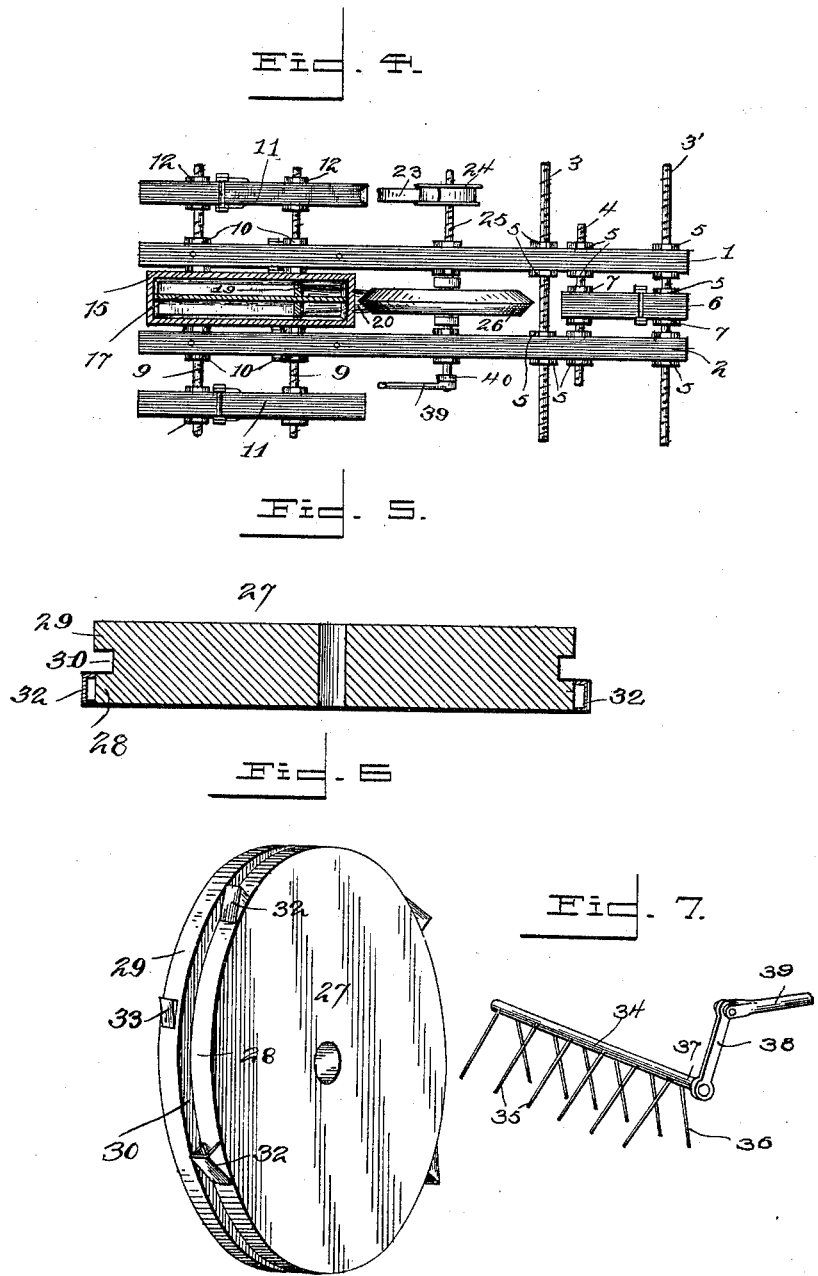

UNITED STATES PATENT OFFICE.

JERRY PENNINGTON, OF VERNON, ALABAMA.

COMBINED PLOW AND SEED-PLANTER.

SPECIFICATION forming part of Letters Patent No. 600,291, dated March 8, 1898.

Application filed October 14, 1897. Serial No. 655,239. (No model.)

*To all whom it may concern:*

Be it known that I, JERRY PENNINGTON, a citizen of the United States, residing at Vernon, in the county of Lamar and State of Alabama, have invented certain new and useful Improvements in a Combined Plow and Seed-Planter; and I do declare the following to be a full, clear, and exact description of the invention, such as will enable others skilled in the art to which it appertains to make and use the same.

My invention relates to a combined plow and seed-planter; and the object is to provide a simple, inexpensive, durable, and effective combination implement of this class.

To this end the invention consists in the construction, combination, and arrangement of the device, as will be hereinafter more fully described, and particularly pointed out in the claim.

In the accompanying drawings the same reference characters indicate the same parts of the invention.

Figure 2:
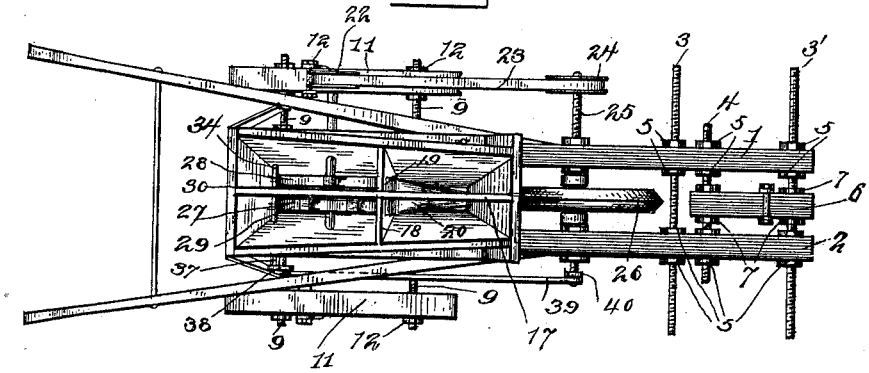
Figure 3:
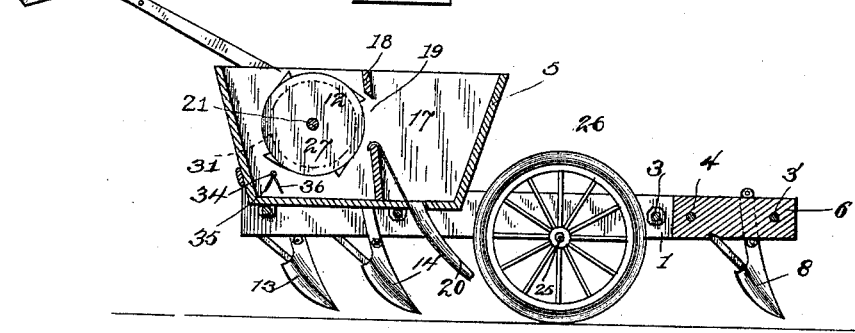

Figure 1 is a side elevation of my improved plow and planter combined. Fig. 2 is a top plan view of the same. Fig. 3 is a longitudinal section. Fig. 4 is a horizontal section. Fig. 5 is a horizontal section of the seed-wheel. Fig. 6 is a perspective view of the same. Fig. 7 is a perspective view of the agitator mechanism.

1 2 represent the parallel plow-beams, connected at their forward ends by the transverse rods 3 3' and 4 4, which are threaded and provided with the jam-nuts 5 5.

6 represents an auxiliary intermediate beam adjustably secured between the forward ends of the main beams on the rods 3' 4 by means of the nuts 7 7, and to this beam is adjustably secured the forward plow-standard 8. The rear ends of the main beams 1 and 2 are adjustably secured with reference to each other on the transverse rods 9 9 by means of the jam-nuts 10 10, and the ends of said rods extend a sufficient distance on both sides of the main beams to receive the lateral parallel beams 11 11, adjustably secured thereon by means of the nuts 12 12, and these lateral beams 11 11 carry adjustable plow-standards 13 13, and similar standards 14 14 are likewise secured to the rear ends of the main beams, as shown.

15 represents the seed-hopper, removably secured to the main beams by means of the thumb-bolts 16. This hopper is provided with a longitudinal partition 17 and an intersecting transverse portion 18, provided with an opening 19, from which a forwardly-depending chute 20 extends through an orifice in the bottom of the hopper and terminating at a point immediately behind and in line with the forward standard 8.

21 represents a transverse shaft journaled in the sides of the hopper and provided at one end with a grooved pulley 22, from which an endless belt 23 extends to a corresponding pulley 24, fixed on the same end of a transverse shaft 25, journaled in the main beams 1 and 2.

26 represents a ground-wheel fixed on the shaft 25 between said beams, and it is formed with a V-shaped periphery which follows in the furrow made by the opening-blade on the standard 8.

27 represents the duplex seed-wheel fixed on the shaft 21, and its periphery is divided into a broad rim 28 and a narrow rim 29 by the annular groove 30, which snugly fits a corresponding orifice 31 in the longitudinal partition 17 in the hopper and thereby prevents the contents of one apartment of the hopper mixing with the other.

32 32 represent a series of buckets fixed on the rim 28, and 33 33 represent a corresponding series of narrower buckets fixed on the rim 29 intermediate of those first mentioned.

34 represents a rock-shaft journaled transversely in the hopper 15, and it is provided with a series of agitator-fingers 35 and 36, while its outer end 37 is provided with a depending arm 38, from which a rod 39 extends to a crank 40, fixed on the end of the ground-wheel shaft 25, which imparts an oscillating movement to the fingers 35 36 to agitate the contents of the hopper. By means of this arrangement guano or any similar fertilizer, as well as corn, cotton, peas, and the like, may be rapidly, economically, and properly drilled or planted in the soil, and by removing the hopper and seeding attachment the machine can be converted into a harrow or cultivator for the proper preparation and subsequent cultivation of the ground.

Having thus fully described my invention, what I claim as new and useful, and desire to secure by Letters Patent of the United States, is—

An implement of the class described, comprising the adjustable parallel beams 1 and 2, provided with the standards 13, 13, and the auxiliary beam 6, provided with the standard 8, in combination with the shaft 25, journaled in the beams 1 and 2, the ground-wheel 26, and the pulley 24, fixed on said shaft, the hopper 15, removably secured to said beams, and provided with the transverse partition 18, provided with an opening 19 and a chute 20, leading therefrom to a point behind and in line with the ground-wheel, the longitudinal partition 17, provided with the orifice 31, the transverse shaft 21, journaled in said hopper, and provided with the pulley 22, and the belt 23, connecting said pulley with the pulley 24, and the seed-wheel 27, fixed on said shaft 21, having its periphery formed with a broad rim 28, a narrow rim 29 separated by the annular groove 30, and a series of seed-buckets 32, 33, intermediately fixed on said rims, substantially as shown and described.

In testimony whereof I hereunto affix my signature in presence of two witnesses.

JERRY PENNINGTON.

Witnesses:
E. R. BURNS,
C. C. NESMITT.